Nov. 15, 1949     O. M. ANDERSON     2,487,960

TWO-SPEED WASHING MACHINE TRANSMISSION MECHANISM

Filed Jan. 25, 1946     2 Sheets-Sheet 1

Inventor

OSCAR M. ANDERSON

By *W. Clay Lindsey*

Attorneys

Nov. 15, 1949     O. M. ANDERSON     2,487,960
TWO-SPEED WASHING MACHINE TRANSMISSION MECHANISM
Filed Jan. 25, 1946     2 Sheets-Sheet 2
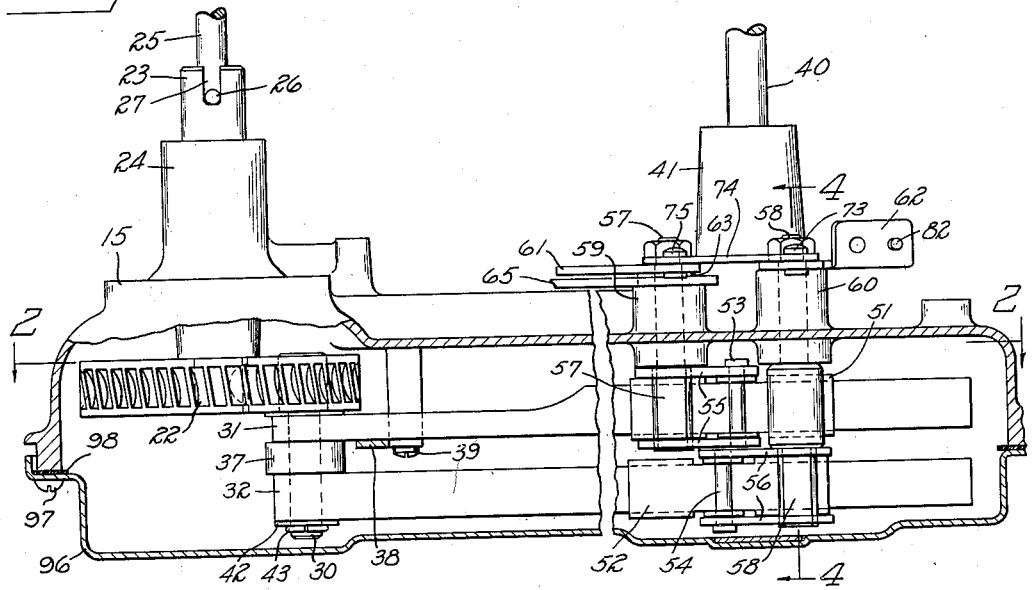
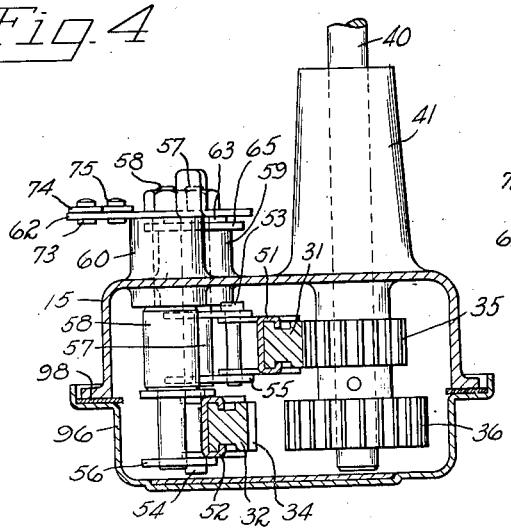
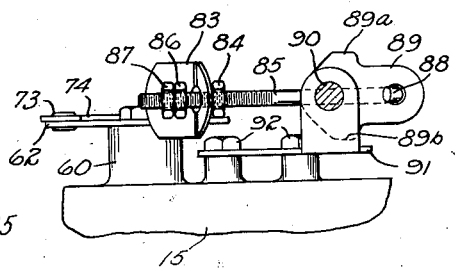
Inventor
OSCAR M. ANDERSON
By W. Clay Lindsey
Attorney Patented Nov. 15, 1949

2,487,960

UNITED STATES PATENT OFFICE 2,487,960

TWO-SPEED WASHING MACHINE TRANSMISSION MECHANISM

Oscar M. Anderson, New Britain, Conn., assignor to Landers, Frary & Clark, New Britain, Conn., a corporation of Connecticut Application January 25, 1946, Serial No. 643,260

7 Claims. (Cl. 74—76)

The present invention relates to washing machines of the type having an agitator driven by an electric motor.

An aim of the invention is to provide an improved transmission of durable and economical construction by which the agitator may be driven by an electric motor at different speeds.

More particularly, it is an object of the invention to provide an improved transmission mechanism between the motor and agitator shaft of a washing machine of the type used in home laundries which may be easily conditioned by a simple manipulation for operation at either of two speeds and which may be shifted into neutral so that the motor may operate auxiliary devices, such as a wringer, while the agitator is stationary.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Fig. 3 is a side view looking in the direction of arrow 3 of Fig. 1, the housing of the transmission being shown in section;

Fig. 4 is a sectional view on line 4—4 of Fig. 3; and

Figure 1:
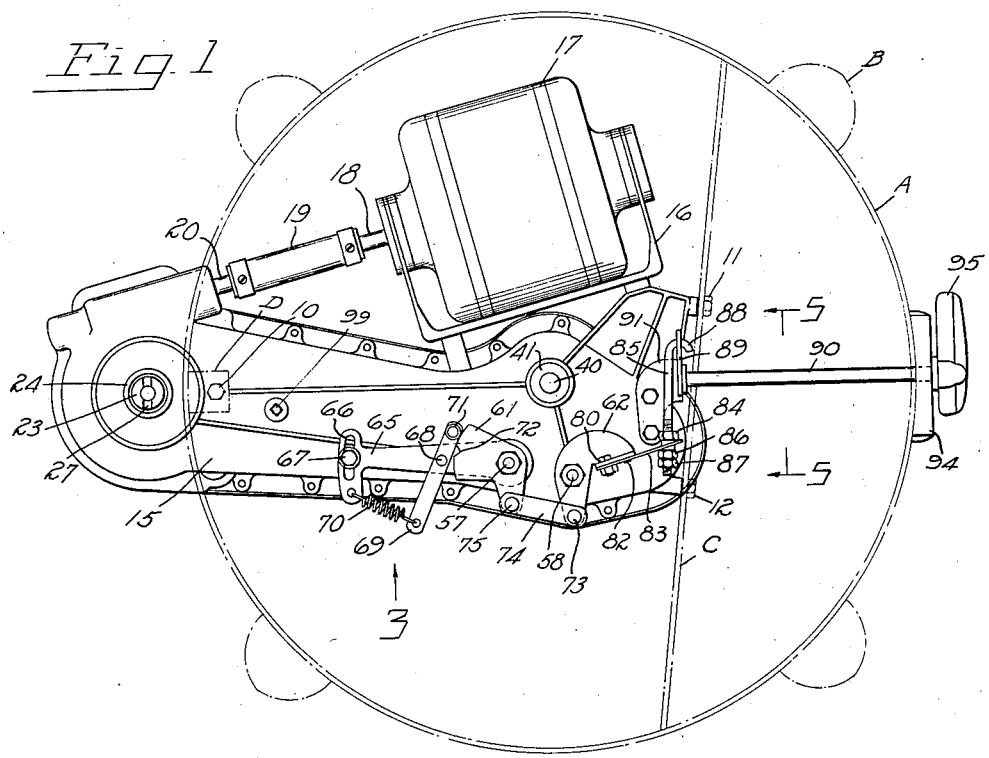
Figure 1 is a top plan view of the transmission mechanism and driving motor shown attached to the underside of a washing machine, a phantom plan view of which is indicated by dot-dash lines.
Figure 2:
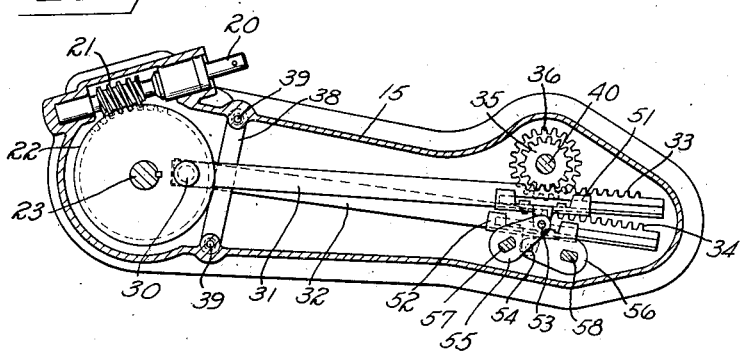
Fig. 2 is a sectional view substantially on line 2—2 of Fig. 3.

Fig. 5 is a sectional view on line 5—5 of Fig. 1 and is drawn to the same scale as Figs. 3 and 4 which are drawn to a larger scale than Figs. 1 and 2.

Referring to Fig. 1, washing machine tub A is supported by legs B and carries a plate C and an angle bracket D. To bracket D by screw 10 and to plate C by screws 11 and 12 there is attached the upper transmission housing member 15 which supports the cradle or bracket 16 of an electric motor 17 whose shaft 18 is connected by coupling 19 with a shaft 20 journaled in housing member 15 and providing a worm 21 meshing with a worm gear 22 attached to a shaft 23 journaled in a bearing 24 (Fig. 3) provided by member 15 and providing a socket for receiving the lower end of a shaft 25 having a cross pin 26 received by notches 27 in shaft 23. Shaft 25, which leads to a wringer mechanism not shown, may be disconnected from shaft 23 by the lifting of shaft 25.

Worm gear 22 carries a crank pin 30 connected with bars 31 and 32 providing, respectively, racks 33 and 34 meshable, respectively, with gears 35 and 36 attached to an agitator shaft 40 journaled in a bearing 41 provided by housing member 15. Bearings 24 and 41 support their shafts vertically as well as laterally. At crank pin 30, the bars 31 and 32 are spaced by a washer 37; and the bar 31 rests upon a plate 38 attached by screws 39 to member 15. The bar 32 rests upon a washer 42 retained upon the crank pin 30 by a wire split-ring 43 which snaps into a groove provided by pin 30.

The right ends of bars 31 and 32 are slidably supported by cradles 51 and 52, respectively, connected by pins 53 and 54, respectively, with two plate levers 55 and 56, respectively, attached to shafts 57 and 58, respectively, journaled in bearings 59 and 60, respectively, provided by housing member 15. Shafts 57 and 58 are attached, respectively, to levers 61 and 62 through which the weight of the shafts 57 and 58 and parts supported thereby is transferred to the bearings 59 and 60. Lever 61 rests upon a washer 63 (Fig. 4) which rests upon a plate 65 (resting on bearing 59) having an arcuate slot 66 which receives a screw 67 threaded into housing member 15 thereby providing for the angular adjustment, relative to plate 61, of a pivot pin 68 (carried by plate 65) which journals a lever 69 urged clockwise by a spring 70 (connecting the lever 69 with plate 65) in order to cause a roller 71 carried by lever 69 to engage lever 61 and, more particularly, to engage a notch 72 in lever 61 when the mechanism is in neutral condition with neither of the racks engaging a gear.

Lever 62 is connected by pin 73, link 74 and pin 75 with lever 61. Lever 62 is connected by screw 80, nut 81 and locating stud or deformation 82 (see Fig. 3) with a leaf spring 83 whose free end is apertured to receive the shank of a nut 84 threaded on a rod 85 and secured in the desired position of adjustment along the rod by lock nuts 86 and 87. Rod 85 has a hook 88 received by a hole in a lever 89 attached to a shaft 90 journaled, at its left end, in a bracket 91 attached by screws 92 to housing member 15. The right end of shaft 90 is journaled in a bracket 94 carried by the tub A and extends beyond the tub slightly to present to the view of the operator a control lever 95 attached to said shaft.

When lever 95 is up, as viewed in Fig. 1, the rod 85 is pulled up further than necessary to shift rack 33 into mesh with gear 35 and the leaf spring 83 bent slightly upwardly, as viewed in Fig. 1, and to the right, as viewed in Fig. 5, thereby urging the shaft 90 left (Fig. 5) in its bearing bracket 91 in order frictionally to retain the lever 95 in the position shown in Fig. 1 corresponding to which lever 89 has been rotated fully in a clockwise direction until its lug 89b stops on the bracket 91. In this position of lever 89, the center line of rod 85 crosses the axis of shaft 90. In other words, the rod 85 and the crank (provided by lever 89) are on "dead center." Therefore, accidental turning of shaft 90 in a counterclockwise direction (Fig. 5) due to vibration of the washing machine is avoided. Similarly, when lever 95 is turned 180°, rod 85 moves down further than necessary to demesh rack 33 from gear 35 and to mesh rack 35 with gear 36 and leaf spring 83 is bent to the left, as viewed in Fig. 5, in order to provide resistance through friction tending to maintain the lever 95 in the position 180° from that shown in Fig. 1. Movement of lever 95 into the position causes lever 89 to rotate counterclockwise from the position shown in Fig. 5 until the lug 89a of lever 89 strikes the bracket 91; and then the rod 85 and the lever 89 are again on dead center; and accidental turning of shaft 90 in a clockwise direction due to vibration of the washing machine is avoided. Therefore, the operation of the washing machine does not cause the accidental demeshment of a gear from a rack.

When the lever 95 is moved into a position midway between the limits of its movement, neither of the racks meshes with a gear; and the motor 17 is uncoupled from the agitator. In this way, the wringer can be operated by the motor without operating the agitator. The positioning of the lever 95 in the neutral position for engaging neither rack with a gear is perceived by the hand of the operator as the roller 71 on lever 69 engages the notch 72 in lever 61, and also by the ear of the operator when the roller "clicks" into engagement with the notch. The plate 65 is made adjustable so that a factory adjustment can be made so that roller 71 is received by the notch 72 when both racks are out of mesh with their respective gears.

The bracket 94 is provided with indicia, such as "High," toward which the lever 95 points when rack 33 meshes with gear 35, "Low" (180° from "High") toward which lever 95 points when rack 34 meshes with gear 36, and "Neutral" or "Off" toward which lever 95 points when roller 71 engages the notch 72.

If lever 95 is shifted rapidly between its rack-meshing positions and it should happen that rack teeth will abut gear teeth before meshing, lever 95 can still be moved to the limit of its travel as the leaf-spring 83 will bend to permit such movement. The abutting teeth being held in engagement under spring pressure, the instant the rack is displaced relative to the gear, whose motion is retarded by the contents of the tub, so that rack teeth register with gear teeth spaces, the rack teeth will be quickly moved by spring action into driving engagement with the gear teeth. In this way, the liability of breakage of rack teeth or gear teeth is minimized and the noise of tooth engagement is materially reduced.

From the foregoing description of an embodiment thereof, it is apparent that the present invention provides a mechanism of simple and durable construction and one which can be manufactured at relatively low cost. The upper housing member 15 is the frame which supports the motor and the mechanism which is readily accessible for repairs and replacements upon removal of the lower housing member 96 secured to the upper member by screws 97 with a sealing gasket 98 therebetween. Member 96 is pan-like in shape to provide for the reception of a quantity of lubricant introduced through an opening in upper member 15 and closed by a plug 99 (Fig. 1). This lubricant is distributed by the splashing action thereon effected chiefly by the reciprocations of the rack bars. Liability of breakage is minimized because only one rack at a time can be meshed with a gear; and gear meshing is effected by yielding pressure acting through the leaf-spring member 83.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A multi-speed mechanism unit for washing machines comprising a frame adapted to be mounted underneath the washing machine tub, a driving motor, two racks supported by the frame and reciprocated by the motor, a shaft supported by the frame for driving the washing machine agitator, two gears of different diameters connected with the shaft and adapted to be engaged respectively by the racks, cradles respectively supporting the racks for reciprocatory movement, two control shafts, levers respectively connected with the shafts and supporting the cradles for movement in opposite directions when the shafts turn in the same direction, and means for concurrently turning the control shafts in the same direction in order selectively to mesh the racks with the gears.

2. A multi-speed mechanism unit for washing machines comprising a frame adapted to be mounted underneath the washing machine tub, a driving motor, two racks supported by the frame and reciprocated by the motor, a shaft supported by the frame for driving the washing machine agitator, two gears of different diameters connected with the shaft and adapted to be engaged respectively by the racks, cradles respectively supporting the racks for reciprocatory movement, two control shafts, levers respectively connected with the shafts and supporting the cradles for movement in opposite directions when the shafts turn in the same direction, a control member, a spring connected therewith and operable to transmit motions in either direction from the control member, and means to which the spring transmits motion from the control member and operable to turn the control shafts concurrently in either direction in order selectively to mesh the racks with the gears.

3. A multi-speed mechanism unit for washing machines comprising a frame adapted to be mounted underneath the washing machine tub, a driving motor, two racks supported by the frame and reciprocated by the motor, a shaft supported by the frame for driving the washing machine agitator, two gears of different diameters connected with the shaft and adapted to be engaged respectively by the racks, cradles respectively supporting the racks for reciprocatory movement, two control shafts, levers respectively connected with the shafts and supporting the cradles for movement in opposite directions when the shafts turn in the same direction, means for turning the control shafts concurrently in the same direction in order selectively to mesh the racks with the gears, and means for resiliently retaining the shafts in a neutral position wherein neither one of the racks engages a gear.

4. A multi-speed mechanism unit for washing machines comprising a frame adapted to be mounted underneath the washing machine tub, a driving motor, two racks supported by the frame and reciprocated by the motor, a shaft supported by the frame for driving the washing machine agitator, two gears of different diameters connected with the shaft and adapted to be engaged respectively by the racks, a control lever, a shaft connected with the control lever, a crank lever connected with the shaft, a rod connected with the crank and moved by the control lever into either of two dead center positions, means for moving the racks selectively into engagement with the gears, one rack being meshed with a gear when the rod is in a dead center position, and a spring for transmitting motion in either direction from the rod to said means, said rod having movement in either direction in excess of that required to mesh a rack with a gear whereby the spring is stressed when the rod is in either dead center position and consequently the racks are selectively maintained in mesh with the gears under yielding pressure by said spring, said spring reacting through the rod to the crank lever and to the crank lever shaft thereby providing spring-effected frictional resistance to movement of said rod from either dead center position.

5. A multi-speed mechanism unit for washing machines comprising a frame adapted to be mounted underneath the washing machine tub, a driving motor, two racks supported by the frame and reciprocated by the motor, a shaft supported by the frame for driving the washing machine agitator, two gears of different diameters connected with the shaft and adapted to be engaged respectively by the racks, means for moving the racks selectively into engagement with the gears, a control lever and a mechanism for transmitting from the lever to said means that motion which is required for gear meshing, said mechanism including a single spring means which is stressed in the event of gear tooth abutment thereby permitting the lever to be moved to the end of its travel and thereby storing energy which, upon the attainment of meshing registration of gear teeth, is released quickly to move the selected rack into engagement with a gear.

6. A two-speed mechanism unit for washing machines comprising a frame adapted to be mounted underneath the washing machine tub, a driving motor, two racks supported by the frame and reciprocated by the motor, a shaft supported by the frame for driving the washing machine agitator, two gears of different diameters connected with the shaft and adapted to be engaged respectively by the racks, cradles respectively supporting the racks for reciprocatory movement, two control shafts, means operated by the turning of the shafts in the same direction for moving the cradles and racks in opposite directions relative to the gears, levers respectively connected with the shafts, a link connecting the levers, a control handle, means for connecting the handle with one of the levers whereby the handle moves both levers, the other lever providing a recess, and a member spring-urged toward said other lever and received by the recess thereof when the handle is in a position such that neither of the racks engages a gear whereby the racks are yieldingly retained in neutral position.

7. A two-speed mechanism unit for washing machines comprising a frame adapted to be mounted underneath the washing machine tub, a driving motor, two racks supported by the frame and reciprocated by the motor, a shaft supported by the frame for driving the washing machine agitator, two gears of different diameters connected with the shaft and adapted to be engaged respectively by the racks, cradles respectively supporting the racks for reciprocatory movement, two control shafts, means operated by the turning of the shafts in the same direction for moving the cradles and racks in opposite directions relative to the gears, levers respectively connected with the shafts, a link connecting the levers, one of the levers providing a recess, a member spring-urged toward said lever and received by the recess when the shafts are in positions such that neither of the racks engages a gear whereby the racks are yieldingly retained in neutral position, a control handle, a control shaft connected with the control handle, a crank lever connected with the control shaft, a rod connected with the crank and moved by the control handle into either of two dead center positions, and a spring for transmitting movement in either direction from the rod to the other of the two levers first mentioned, said rod having movement in either direction in excess of that required to mesh a rack with a gear whereby the spring is stressed when the rod is in either dead center position and consequently the racks are selectively maintained in mesh with the gears under yielding pressure, said spring reacting through the rod to the crank lever and to the crank lever shaft thereby providing spring-effected frictional resistance to movement of rod from either dead center position.

OSCAR M. ANDERSON.

REFERENCES CITED

The following references are of record in the file of this patent:

UNITED STATES PATENTS

| Number | Name | Date |
| --- | --- | --- |
| 1,688,214 | Walden | Oct. 16, 1928 |
| 2,225,249 | Oakley | Dec. 17, 1940 |
| 2,274,931 | Oakley | Mar. 3, 1942 |
| 2,277,829 | Oakley | Mar. 31, 1942 |
| 2,309,567 | Baule | Jan. 26, 1942 |